United States Patent [19]
Asaka et al.

[11] Patent Number: 5,525,882
[45] Date of Patent: Jun. 11, 1996

[54] METHOD AND SYSTEM FOR MANEUVERING A MOBILE ROBOT

[75] Inventors: Shunichi Asaka, Sagamihara; Tomio Echigo, Yokohama; Shinichiro Hazeki, Kawasaki; Shigeki Ishikawa, Tokyo, all of Japan

[73] Assignee: International Business Machines Corporation, Armonk, N.Y.

[21] Appl. No.: 328,030

[22] Filed: Oct. 24, 1994

[30] Foreign Application Priority Data

Oct. 25, 1993 [JP] Japan .................................. 5-266647

[51] Int. Cl.⁶ .................................................. B25J 19/02
[52] U.S. Cl. .................. 318/568.16; 318/568.12; 901/47
[58] Field of Search .................... 318/568.12, 568.11, 318/568.16, 587; 901/1, 46, 47; 364/424

[56] References Cited

U.S. PATENT DOCUMENTS 4,628,453  12/1986  Kamejima et al. .................. 364/424
4,652,803   3/1987  Kamejima et al. .................. 318/587
4,954,962   7/1990  Evans et al. ........................ 901/47

*Primary Examiner*—David S. Martin
*Attorney, Agent, or Firm*—Jonathan E. Jobe; Andrew J. Dillon

[57] ABSTRACT

A method and system for maneuvering a mobile robot are disclosed, which include a mobile robot having a plurality of sensors, including a sensor which detects the presence of an object and a sensor which detects image information related to the object. Utilizing data acquired by the plurality of sensors, elements of the object are determined. A hypothesis expressing the configuration of the object is then generated from the elements interpreted from the data. The hypothesis is generated by referencing a table in which interpretations of data acquired by the plurality of sensors are associated with possible configurations of objects in response to the generated hypothesis, the mobile robot is moved along a path which avoids the object.

14 Claims, 10 Drawing Sheets

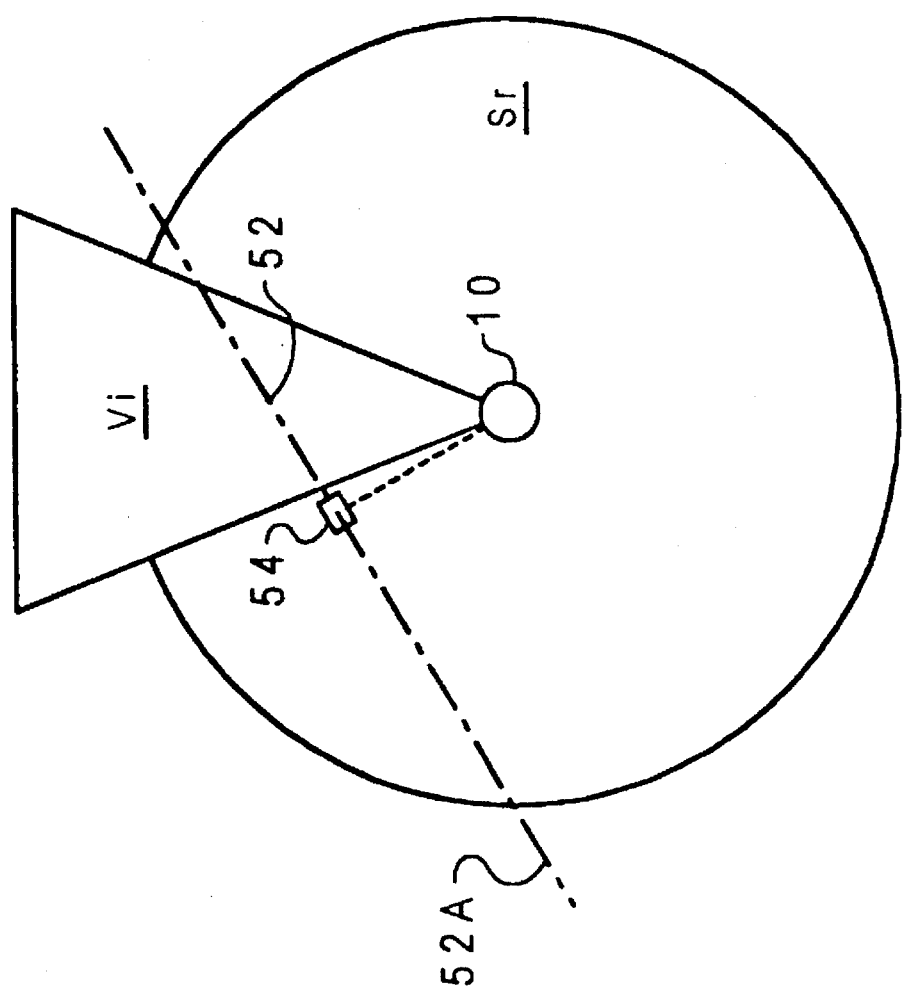

METHOD AND SYSTEM FOR MANEUVERING A MOBILE ROBOT

BACKGROUND OF THE INVENTION

1. Technical Field

The present invention relates in general to a method and system for guiding a mobile robot and, in particular, to a method and system for guiding a mobile robot based on the surrounding environment. Still more particularly, the present invention relates to a method and system for guiding a mobile robot based on a hypothesis of an object's configuration derived from environmental data.

2. Description of the Related Art

Mobile robots are used in manufacturing plants to transport loads. Many such mobile robots either move along a given run guide, such as a rail, or provide a detector for detecting the run distance traveled along a predetermined route stored in the mobile robot to enable it to move based on detected values. Some mobile robots have detectors such as ultrasonic wave sensors and bumpers (fenders) to avoid obstacles in the path of the mobile robot.

More recently, independent mobile robots having a free range of motion have become available. These independent robots must be able to recognize the surrounding environment to enable them to safely and efficiently move. Consequently, different types of sensors must be provided to detect a plurality of different states to enable independent mobile robots to operate safely and efficiently.

The sensors of a mobile robot have characteristics that differ with the type of sensor. Consequently, it is possible that the configurations of the environment derived from data acquired by each of a plurality of sensors may be contradictory. The configuration of the environment includes artificial and natural objects that can be detected by independent mobile robots. For example, ultrasonic wave sensors cannot provide accurate distance information for objects having surfaces at an angle relative to the radiative direction of the ultrasonic wave greater than 90°. Stereo cameras, however, can obtain distance information from such surface configurations. Thus, distance information differs with the type of sensor.

An algorithm is available which evaluates the reliability of environmental data obtained from sensors by a statistical analysis that resolves contradictions between sensor data. (A. Elfes, "Sonar-Based Real-World Mapping and Navigation," IEEE Journal of Robotics and Automation, Vol. RA-3, No. 3, pp 249–265, June 1987; H. F. Durrant-Whyte, "Sensor Models and Multisensor Integration," The Int'l Journal of Robotics Research, Vol. 7, No. 6 pp 97–113, Dec. 1988). However, these techniques only improve the reliability of sensor data and cannot resolve contradictions generated by information inferred from other sensor data. In other words, sensor data depends on the configuration of the scene, so reliability must be changed for each sensor with relation to the configuration of the scene.

An additional difficulty in guiding mobile robots is that some objects are very difficult to detect due to sensor characteristics. Even though sensor data increases with respect to an object, reliability in interpreting objects is not necessarily improved due to contradictions between interpretations of sensor data. Thus, it becomes impossible to accurately interpret the environment. In order to be interpreted accurately, the environment must be interpreted for each sensor. If a contradiction arises between interpretations of the environment generated from multiple sensors, it must be determined which sensor gives an accurate interpretation.

Even when information on an object is insufficient, active sensing has been proposed that produces highly reliable sensor information by predicting an environment from information obtained up to that time, acting based on predictions, and harmonizing predictions and actions by sensors (S. A. Stanfield, "A Robotic Perceptual System Utilizing Passive Vision and Active Touch," The Int'l Journal of Robotics Research, Vol. 7, No. 6, pp 138–161, Dec. 1988). This predictive method provides highly reliable sensor data from an object located outside the dynamic range of sensors or at a position that cannot be initially detected by presuming a position favorable for detection and moving a sensor to that position. However, this method requires a movement plan which enables a sensor to be moved to a position for optimal object detection. It is difficult to devise an effective movement plan from sensor data having low reliability, particularly at initial detection. Consequently, a movement plan which enhances detection prevents an independent mobile robot from following its original movement plan.

A similar concept called intentional sensing has been suggested, which determines the mechanism of sensing in conjunction with a plan for recognition (Masatoshi Ishikawa, "Problem of Sensor Fusion," Journal of Japan Robotics Academy, Vol. 8, No. 6, pp 735–742, Dec. 1990). This method suggests a detection structure in which detection plans are clearly predetermined for an environment and in which methods utilized to detect known objects are predetermined. This method is limited to the conceptual level, however, and no operative embodiment has been proposed.

Consequently, it would be desirable to provide a method and system for guiding an independent mobile robot safely and effectively based on environmental data obtained utilizing a plurality of different sensors.

SUMMARY OF THE INVENTION

It is therefore one object of the present invention to provide a method and system for maneuvering a mobile robot.

It is another object of the present invention to provide a method and system for maneuvering a mobile robot based on the surrounding environment.

It yet another object of the present invention to provide a method and system for maneuvering a mobile robot based on a hypothesis of an object's configuration derived from environmental data.

The forgoing objects are achieved as is now described. A method and system for manuevering a mobile robot are disclosed, which include a mobile robot having a plurality of sensors, including a sensor which detects the presence of an object and a sensor which detects image information related to the object. Utilizing data acquired by the plurality of sensors, elements of the object are determined. A hypothesis expressing the configuration of the object is then generated from the elements interpreted from the data. The hypothesis is generated by referencing a table in which interpretations of data acquired by the plurality of sensors are associated with possible configurations of objects. In response to the generated hypothesis, the mobile robot is moved along a path which avoids the object.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 depicts the detection regions of the ring device and the stereo cameras;

DETAILED DESCRIPTION OF PREFERRED EMBODIMENT

Figure 1:
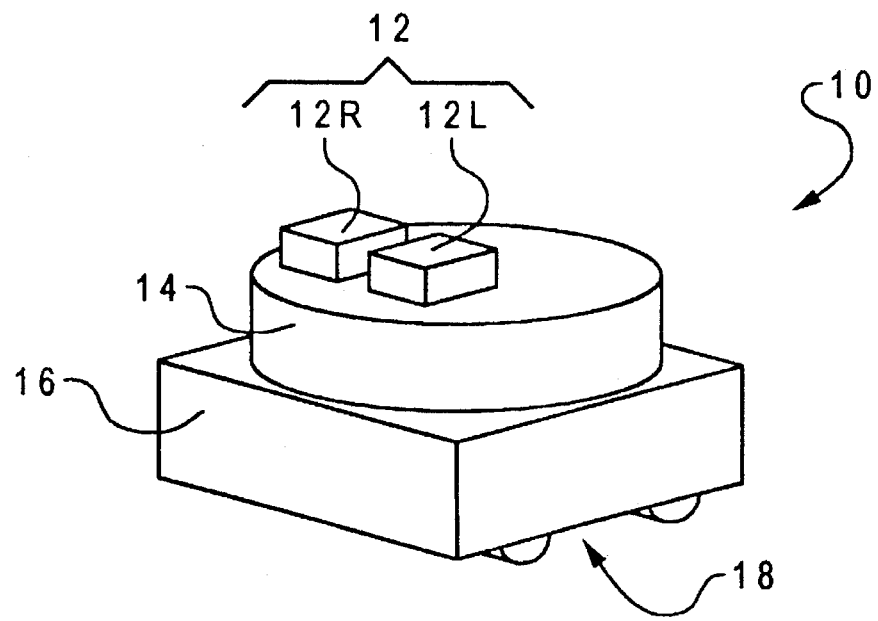
FIG. 1 is a perspective view of a mobile robot.

With reference now to the figures, and in particular with reference to FIG. 1, there is illustrated a preferred embodiment of a mobile robot utilizing the method and system of the present invention. As shown in FIG. 1, mobile robot 10 has different types of sensors that detect different data, including sonar ring device 14 that obtains distance data utilizing ultrasonic waves, and stereo cameras 12 that obtain as three-dimensional sensor data utilizing stereo vision utilizing cameras 12R and 12L (described hereinafter in detail). In addition, mobile robot 10 includes controller 16, illustrated in detail in FIG. 2, consisting of a microcomputer or the like for generating and verifying a hypothesis with respect to the surrounding environment based on sensor data from sonar ring device 14 and stereo cameras 12. Mobile robot 10 also includes run device 18 driven by signals from controller 16. Run device 18 includes distance meter 20 for measuring the run distance of the mobile robot and direction meter 22 for measuring the direction of the current mobile robot.

Figure 3:
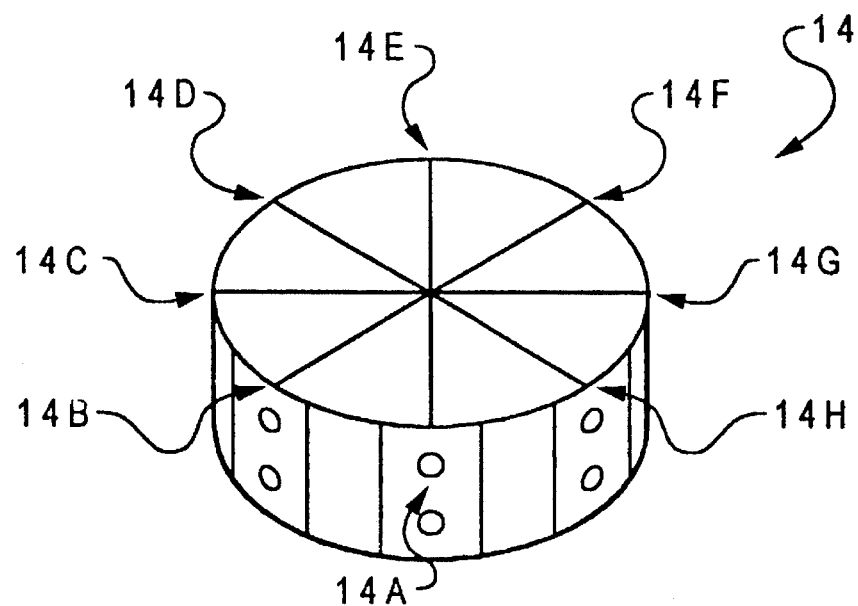
FIG. 3 depicts a sonar ring device.

The base line of stereo cameras 12 is 15 cm long. Stereo cameras 12 are disposed so that the optical axes of stereo cameras 12R and 12L are parallel to each other, and the cameras are inclined at an elevation angle of 18 degrees with respect to the horizontal. The orientation of stereo 12L and 12R provides cameras a view from the floor to a height of 5 meters. They enable the obtaining of an image (stereo vision) similar to human vision. Stereo cameras 12R and 12L are connected to controller 16. As illustrated in greater detail in FIG. 3, sonar ring device 14 detects an object via sound utilizing 8 sonar devices 14A–14H which are equally spaced around the circumference of sonar ring device 14.

Each of sonar ring devices 14A–14H includes a sound sender and a sound receiver, both of which are directed outward from the center of sonar ring device 14. Sonar ring device 14 is connected to controller 16.

Figure 2:
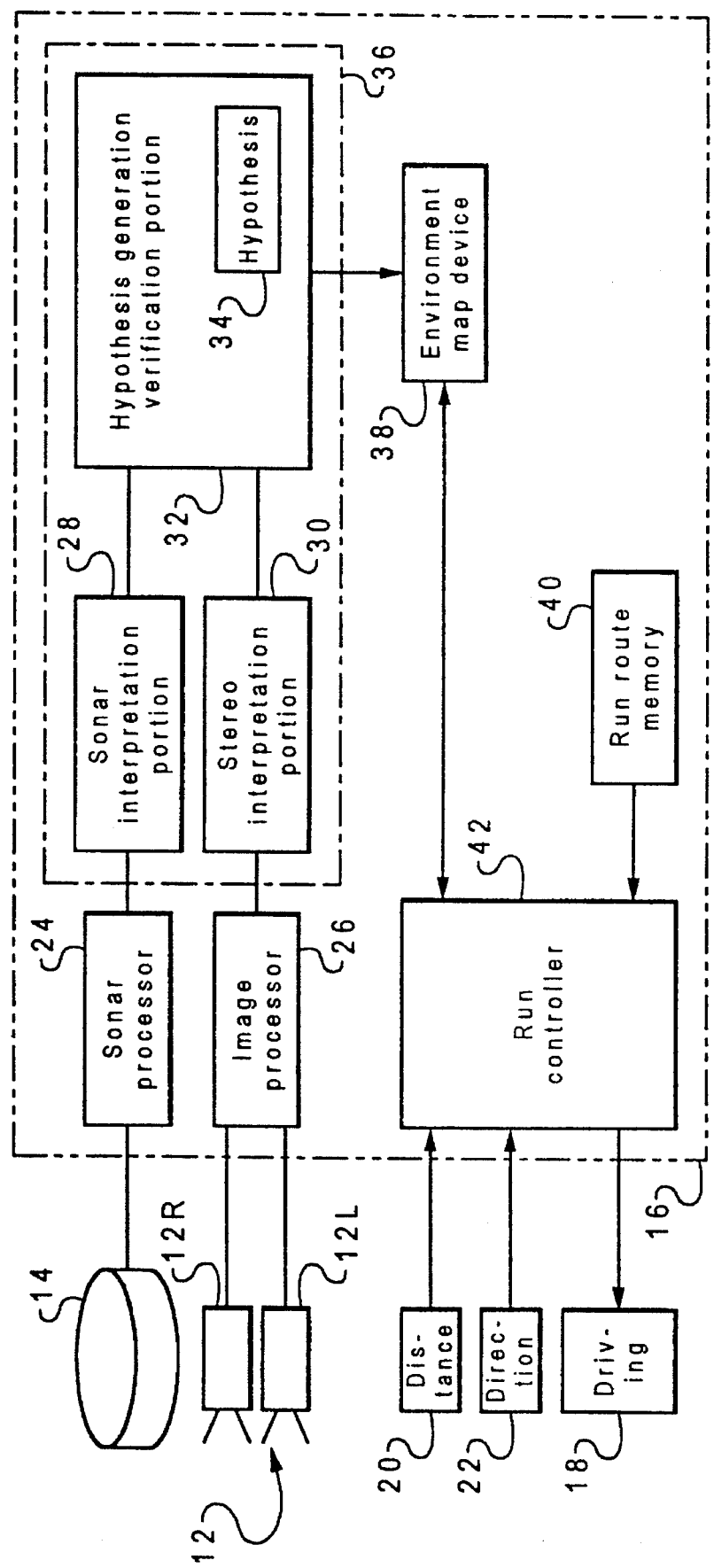
FIG. 2 is a block diagram of the controller, which includes a hypothesis verification device in a preferred embodiment of the present invention.

Referring now to FIG. 2, controller 16 consists of sonar processor 24, image processor 26, a hypothesis verification device 36, an environment map 38, run route memory 40, and run controller 42. Hypothesis verification 36 device 36 consists of a sonar interpretation section 28, a stereo interpretation section 30, and hypothesis formation verification device 32 having hypothesis memory 34.

Sonar ring device 14 is connected to sonar processor 24, which processes data from each of sonar devices 14A to 14H. Under the control of sonar processor 24, each of the sonar devices 14A to 14H transmit ultrasonic waves with a delay of 25 ms between waves from adjacent sonar devices to prevent interference between waves. The transmission frequency is 40 kHz and can measure the distance to an object within a range of 3.0 to 0.1 m. Sonar processor 24 is connected to sonar interpretation section 28. The directivity of sender-receivers in each sonar devices 14A to 14H is not acute. Unlike light, an ultrasonic beam dissipates and expands in width when transmitted through air. When the distance of the reflection surface is measured with this wide beam, the distance to a reflecting surface can be measured only to an accuracy on the order of the beam width. Even when the beam is reflected on the surface at one point, the surface can be detected if it is within the arc corresponding to the beam width. In this way, each sonar device has a detection area whose size is proportional to the distance to an object. Consequently, as illustrated in FIG. 6, the detection area in which an object around robot 10 can be detected is given as detection area $V_i$ for stereo cameras 12, whereas it is given as detection area $S_r$ for sonar ring device 14.

Image processor 26 is connected to stereo cameras 12R and 12L to process an image photographed by stereo cameras 12R and 12L. This processing provides three-dimensional information from each type of image information (video signals or the like) by means of stereo vision formed by stereo cameras 12R and 12L arranged as described above. Image processor 26 is connected to stereo interpretation section 30 in hypothesis verification device 36.

Three-dimensional information is obtained with this stereo vision for edges where the brightness of the image changes abruptly. In addition, the horizontal arrangement of the two cameras enables the obtaining of an image corresponding to an edge which is not planar. However, it is still impossible to obtain an image corresponding to the portion between images at a horizontal edge. Three-dimensional information can then be obtained at a horizontal edge by the correspondence to the end point of the horizontal edge.

Figure 4A:
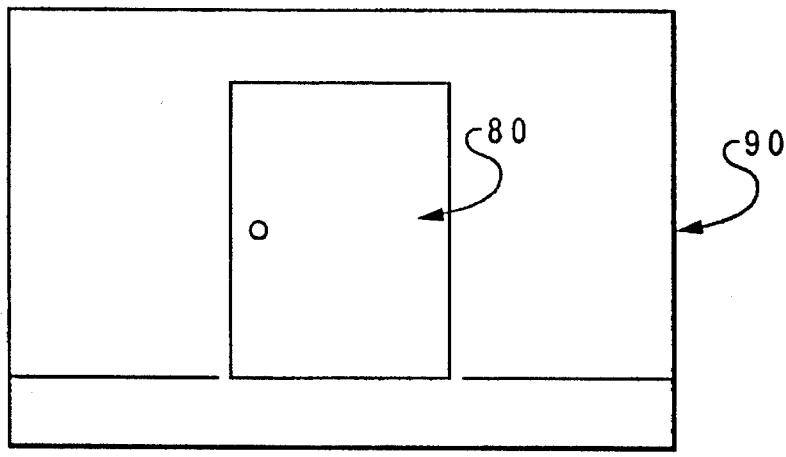
FIG. 4 illustrates the acquisition of three-dimensional data by stereo cameras.
Figure 4B:
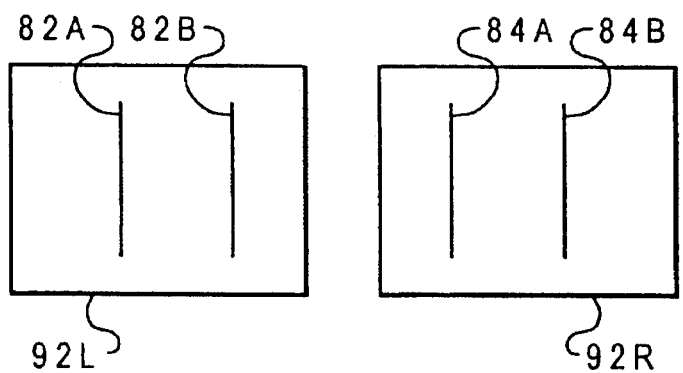
Figure 4C:
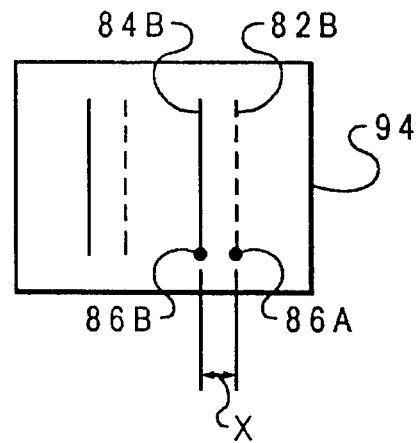

With reference now to FIG. 4A, suppose that door 80 is photographed as an object assuming image 90 as the forward view of stereo cameras 12. Each stereo camera 12R and 12L photographs door 80, but the photograph locations of the two cameras are displaced from each other due to the horizontal arrangement. Consequently, image information is processed in a procedure such as differentiation to select an edge where the brightness abruptly changes in the horizontal direction. Thus, as shown in FIG. 4B, image 92R processed by camera 12R and image 92L processed by camera 12L are provided. In processed image 92R, edges where the brightness in the vertical direction of door 80 changes abruptly are indicated as a line segments 82A and 82B. Thus, as shown in FIG. 4C, in image 94 formed by synthesizing processed images 92R and 92L, end points 86A and 86B should correspond. Spacing between line segments 82B and 84B corresponds to the distance to door 80. The line segment obtained from line segments 82B and 84B forms three-dimensional information. The line segment may be described by a position at which the displacement of images is corrected. Otherwise, either line segment 82B or 84B may be used.

Hypothesis verification device 36, described in detail later, generates a hypothesis about the environment surrounding mobile robot 10 from the surface component of an object interpreted at sonar interpretation section 28 based on sensor data (hereinafter referred to as sonar data) from sonar ring device 14 and from the configuration of the object interpreted at stereo interpretation section 30 based on sensor data from stereo cameras 12.

Distance meter 20 and direction meter 22 are connected to run controller 42 to specify the current position and direction of mobile robot 10. In addition, environment map device 38 and run route memory 40 are connected to run controller 42. Environment map device 38 stores the surrounding environment map formed by the hypothesis generated by hypothesis verification device 36. This environment map provides a two-dimensional plan view map of the environment. Run route memory 40 stores the run route of mobile robot 10, which is input in advance of operation of mobile robot 10. Run controller 42 controls run device 18 to move mobile robot 10 while avoiding obstacles present on the run route by referring to the running route stored in run route memory 40 and by referring to the environment map obtained from environment map device 38.

Next, movement of mobile robot 10 according to a preferred embodiment of the present invention is explained, together with the operation of the hypothesis verification device 36. First, the interpretation of sonar data by sonar interpretation section 28 of hypothesis verification device 36 is explained. Since the directivity of each sonar device is not as focussed as that of light, as described above, distance information provided by sonar ring device 14 identifies a detected surface as a spherical portion having a size corresponding to the sonar beam width.

The cycle time for detection by sonar ring device 14 is extremely rapid compared to the speed of mobile robot 10. Since distance information obtained during movement is obtained continuously, information can be integrated as a planar surface component. A determination is made as to whether small surface elements obtained at continuous sampling points can be connected when the movement of the mobile robot 10 is offset. When the distance in the center of small surface elements is either equal to the threshold value or less, the distance is integrated as a continuous surface component. The adjustment of receiver sensitivity may result in independently generated noise. If sonar data such as distance data, for example, cannot be obtained at a plurality of sampling points that continue with the passage of time, small surface elements can be eliminated as noise.

Since the environment map is described as a two-dimensional plan view map, the surface component is described as line segment data, which is registered at the starting and end points. When surface elements are obtained that can be connected at four or more continuous sampling points, the line segment is obtained with the minimum self-multiplication method to register, as a surface component, the intersection point of vertical lines that come down from both ends to the line segment.

Sonar ring device 14 detects objects utilizing reflected sound waves. Even though an ultrasonic wave may come from any direction to the surface of the object having an uneven surface (e.g., 50-angstrom roughness) which changes irregularly on the order of the wavelength of the ultrasonic wave, part of the scattered wave returns in the direction the ultrasonic wave was sent, thereby making it possible to obtain distance data. However, if the uneven 50-angstrom surface is one digit shorter than the wavelength of the ultrasonic wave, the surface of the object acts as a mirror to reflect the ultrasonic wave.

Figure 5A:
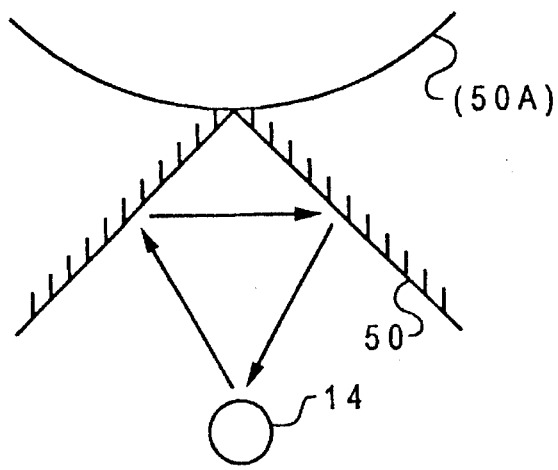
FIGS. 5A–5C illustrates the detection of an error by the sonar ring device.
Figure 5B:
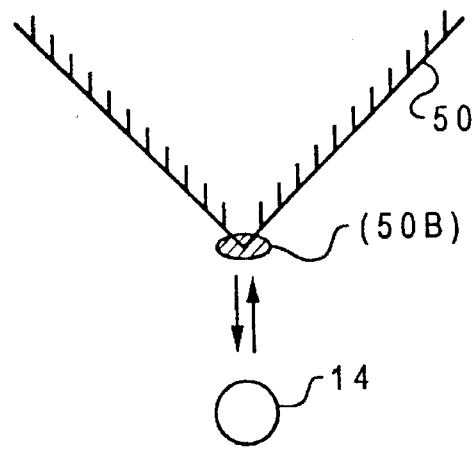
Figure 5C:
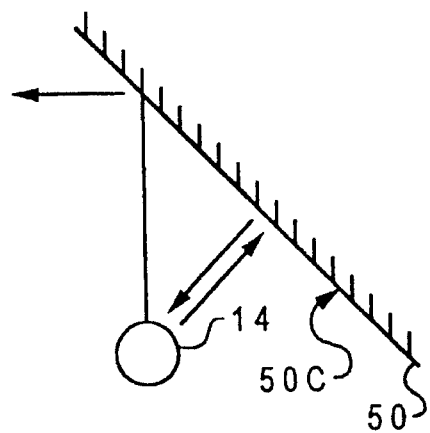

Consequently, as shown in FIG. 5C, one of sonar devices 14A–14H of mobile robot 10 can receive a reflection wave from the surface of an object which is at an angle of 90° or less with respect to the direction of ultrasonic wave radiation from one of sonar device 14A–14H. However, the robot cannot obtain the reflection wave from a surface having an inclination larger than 90°, with the result that data received becomes the same as data in free area (space). Furthermore, another sonar device cannot detect the reflection wave. As a result, even when the registered surface component is interpreted to be free area from sonar data from distant sampling points, this interpretation is not discarded.

In addition, accurate data cannot be obtained from sonar ring device 14 in other cases even when the surface configuration has an angle of less than 90° to the direction of sonar propagation. As shown in FIG. 5A, a radiated ultrasonic wave is reflected from two facing surfaces in a recessed corner back to the receiver. However, distance data obtained from the objects indicate a position far from the actual object (reference numeral 50A). Furthermore, as shown in FIG. 5B, if an object has a projecting corner, the reflected wave can be obtained only at the tip of the projecting corner (reference numeral 50B), whereas no sonar data can be obtained from other areas, which are interpreted as free area. In such a case, it is impossible to obtain an accurate interpretation from sonar data alone without tracing the surface.

Stereo data obtained from stereo cameras 12 provide only three-dimensional information for an edge. It is impossible to obtain data for a surface where the brightness of the image changes gradually as described previously in conjunction with (FIGS. 4A–4C). Consequently, a three-dimensional line segment is assumed connected to the surface, but it is not apparent if the line segment is actually present. As explained above, the edge in the processed image may be a place where the direction of the surface (i.e., the direction of a line normal to the surface) suddenly changes, a boundary line whose one surface cannot be seen from the camera, or a mark or shadow drawn on the surface. Thus, reconstituting the surface from the three-dimensional line segment requires information about which side the surface linked to the three-dimensional line segment is located and another adjacent three-dimensional line segment. Although a plurality of three-dimensional line segments are used to reconstitute the surface, all of the plurality cannot always be obtained at the same time.

A surface that is an obstacle to mobile robot 10 in an indoor environment often stands vertically. In this embodiment, a vertical surface including three-dimensional line segments is adopted as one interpretation. In the example of door 80 of FIG. 4A–4C, two three-dimensional line segments can be obtained. For simplicity, these two three-dimensional line segments are defined as line segments 82A and 82B. Because the vertical surface including line segments 82A and 82B overlaps, it can be interpreted that a surface is present between line segments 82A and 82B.

In some cases when a three-dimensional line segment is obtained, the line is simply drawn on the floor surface. Thus, this three-dimensional line segment can be interpreted two ways: (1) that a surface including this three-dimensional line segment is present, or (2) that the line segment is simply drawn on the floor surface.

Since many vertical surfaces including a particular three-dimensional line segment can be interpreted from a plurality of vertical three-dimensional line segments, the surface located nearest to the mobile robot is interpreted from the stereo data. In addition, the line segment may be severed at the boundary of the field of view, or the image frame, creating the possibility that this line segment can be extended beyond the scope of the field of view.

Hypothesis formation at the interpretation formation section 32 based on sonar and stereo data will now be explained. In a preferred embodiment of the present invention, stereo data obtained from stereo cameras 12 and sonar data such as direction and distance data obtained from the sonar ring device 14 are processed in accordance with the following rules:

(1) A hypothesis about the environment is generated from an interpretation of the environment among the plurality of interpretations that is safe for running the mobile robot.
(2) Interpretations obtained from data acquired by each sensor and interpretations extended based on sensors when not detected, if not contradictory to sensor data, are both utilized in hypothesis formation.
(3) The mobile robot is moved based on a hypothesis which is verified by comparing the hypothesis to sensor data which is continuously obtained as the mobile robot moves.
(4) If the sensor data is contradictory to the hypothesis, the hypothesis is discarded and a new hypothesis is formed from remaining interpretations.

Consequently, as a result of integration, a hypothesis can be obtained which has a high degree of certainty and which is consistent with the verification data.

Since a collision between the mobile robot and an object must be avoided at all costs, priority is given to interpretations of surface components safe for the robot in forming a hypothesis. Hence, in interpreting stereo data (three-dimensional data) obtained by stereo cameras 12, two interpretations are possible: a surface and a drawn line segment. If stereo data are not verified (as described below), the surface interpretation is adopted as a hypothesis. If the detection areas of sonar ring device 14 and stereo cameras 12 do not overlap, interpretations of both sensors are adopted, as is, as a hypothesis. Larger surface components are registered in the hypothesis. In determining whether these interpretations are the same or not, an interpretation nearer to the position of mobile robot 10 is adopted when the maximum value of the distance made by drawing a vertical line from the closer line segment to the further line segment does not exceed the threshold value, or when the distance between the two line segments is not less than the threshold value. In hypothesis generation, surface components are only integrated, and no determination is made about whether or not the hypothesis is contradictory. The above processing is equivalent to a method for collecting data nearest to mobile robot 10. This embodiment thus provides a way to discard an incorrect interpretation in verification to approximate the hypothesis to an accurate environment map. It is this point that the present invention differs sharply from conventional method of evaluating $S_r$, in which an incorrect interpretation cannot be discarded.

In the present invention, sonar ring device 14 and stereo cameras 12 have mutually different areas of detection, as depicted in FIG. 6. The ease of sensor detection differs greatly from one object to another. For example, sonar ring device 14 cannot interpret surface components without moving and cannot detect distant surfaces. In contrast, stereo cameras 12 can perceive a three-dimensional edge farther away than sonar ring device 14. Since the direction in which stereo camera data can be obtained is limited, the reliability of interpretation of the surface from a single three-dimensional edge is very low. Because sensor properties differ, simply interpreting the environment directly from data from each sensor prevents the result of these interpretation from being integrated effectively.

A large surface component is thus required to integrate data from a plurality of different sensors for use in guiding a mobile robot. In addition to direct interpretations based on obtained sensor data, a determination is made including the region outside the scope of sensor detection, as explained later. For example, as illustrated in FIG. 6, when extensible three-dimensional line segment 52 is interpreted as a surface, and surface component 54 from sonar on line segment 52 is an extension of the surface, line segment 52 is interpreted as extending from the field of view of stereo cameras 12 to surface component 54. Interpretations from the different sensors may be extended beyond the field of view of stereo cameras 14 if the extension of the line segment or distance to the line segment is within the threshold value.

When mobile robot 10 moves, it avoids obstacles by referencing the current environment. If an interpretation of sensor data does not agree with the current hypothesis during movement, the hypothesis is discarded (as explained later) and the robot is moved optimally with respect to a new hypothesis based on a new interpretation.

Verification of the hypothesis generated in accordance with the above method is explained below. A bottom-up method, which reconstitutes an environment from sensing data, is ambiguous in interpretation, making it difficult to obtain an accurate environment map. A top-down method, which involves presuming sensing data from the environment map, is easy to apply because the properties of individual sensor data are already known.

In the preferred embodiment of the present invention, the hypothesis is regarded as an environment map. Sensing data that can be presumed with respect to the hypothesis is compared with actually detected sensing data. Then, it is determined whether or not the hypothesis should be discarded based on the result presumed in advance. For each surface configuration, data from either sonar ring device 14 or stereo cameras 12 are given priority. Table 1 illustrates how hypothesis generation verification portion 34 determines whether a hypothesis should be discarded.

TABLE 1

| Surface configuration | Ref. No. | Interpretation based on stereo camera data | Interpretation based on sonar data | Hypothesis |
|---|---|---|---|---|
| Planar | (1) | Surface component | Surface component | Planar |
|  | (2) | Surface component | No surface component | Free space |
|  | (3) | No surface component | Surface component | Planar |
|  | (4) | No surface component | No surface component | Free space |
| Projecting | (5) | — | Surface component near projecting surface | Projecting surface |

TABLE 1-continued

| Surface configuration | Ref. No. | Interpretation based on stereo camera data | Interpretation based on sonar data | Hypothesis |
|---|---|---|---|---|
| | (6) | — | No surface component | Free space |
| Recessed | (7) | — | Surface component near deepest part | Recessed surface |
| | (8) | — | No surface component | Free space |
| Elongated or fine | (9) | Surface component | Surface component | Elongated/ fine surface |
| | (10) | Surface component | No surface component | Judged by size and distance |
| | (11) | No surface component | No surface component | Elongated/ fine surface |

Since only the surface component is described in the hypothesis, if no corresponding hypothesis is present at the surface component position in the interpretation of sensor data, no verification is made and a new hypothesis based on sensor data is generated. When a hypothesis corresponds to the sensing data position, however, verification is made according to the surface configuration of the hypothesis.

Since the sonar ring devices 14 senses only small surface components in a short time, the surface configuration in the hypothesis uses only the surface component obtained from the stereo cameras 12 and a large surface obtained by combining interpretations in hypothesis generation. Consequently, as opposed to a hypothesis for a uniformly large surface, the four different results of verification shown in Table 1 can be presumed from the combination of interpretations of data from sonar ring device 14 and stereo cameras 12. However, in the interpretation of sensor data from the sonar ring devices 14, verification is made based on the interpretation from sonar ring device 14 located proximately to a planar surface or located within the threshold value. Sonar data obtained for a surface at an angle with respect to other surfaces are not used in verification, however. As shown in Table 1, priority is given to interpretations using sonar data in hypothesis verification based on a uniformly large surface.

For example, Reference (2) in Table 1 illustrates discarding the stereo camera data interpretation, which indicates a line segment drawn on the floor, in favor of the sonar data interpretation, which indicates that no surface is present. Similarly, in Reference (3) the sonar data interpretation, which indicates a glass surface, for example, is given priority over the stereo camera data interpretation, which indicates that no surface exists. Finally, Reference (4) illustrates a case in which the large surface component determined by combining interpretations to form the hypothesis is incorrect and the sonar data interpretation is adopted.

Verification of projecting and recessed surfaces is considered next. Projecting and recessed surfaces can only be obtained when a hypothesis generated from a stereo camera data interpretation is adopted. In the case of these two surfaces, then, the interpretation of stereo camera data need not be considered in verification; that is, verification is based only on sonar data. In Reference (5) in Table 1, the surface of the projecting configuration is confirmed when sonar shows the surface component to be present near the projecting surface. If sonar shows no surface component (Reference (6)), stereo data interpretation is treated as a line segment drawn on the floor surface and the hypothesis is discarded. Similarly, in Reference (7) in Table 1, the surface of the recessed configuration is confirmed when the surface component derived from sonar data is present near the deepest area of the recessed surface. If, however, a surface component cannot be obtained from sonar data as illustrated at Reference (8), the stereo data interpretation is treated as a line segment drawn on the floor surface, and the hypothesis is discarded.

Verification of elongated and fine surfaces is considered next. When an elongated or fine surface is based on the sonar interpretation in the hypothesis, the hypothesis is not discarded, regardless of whether or not a surface is present in the stereo camera interpretation (see References (9) and (11)). When stereo camera data yields a surface interpretation, however, and no surface is detected by sonar, a conclusion is drawn on whether or not the hypothesis is discarded based on the ostensible size of the surface and the distance to it (see Reference (10)).

Figure 7:
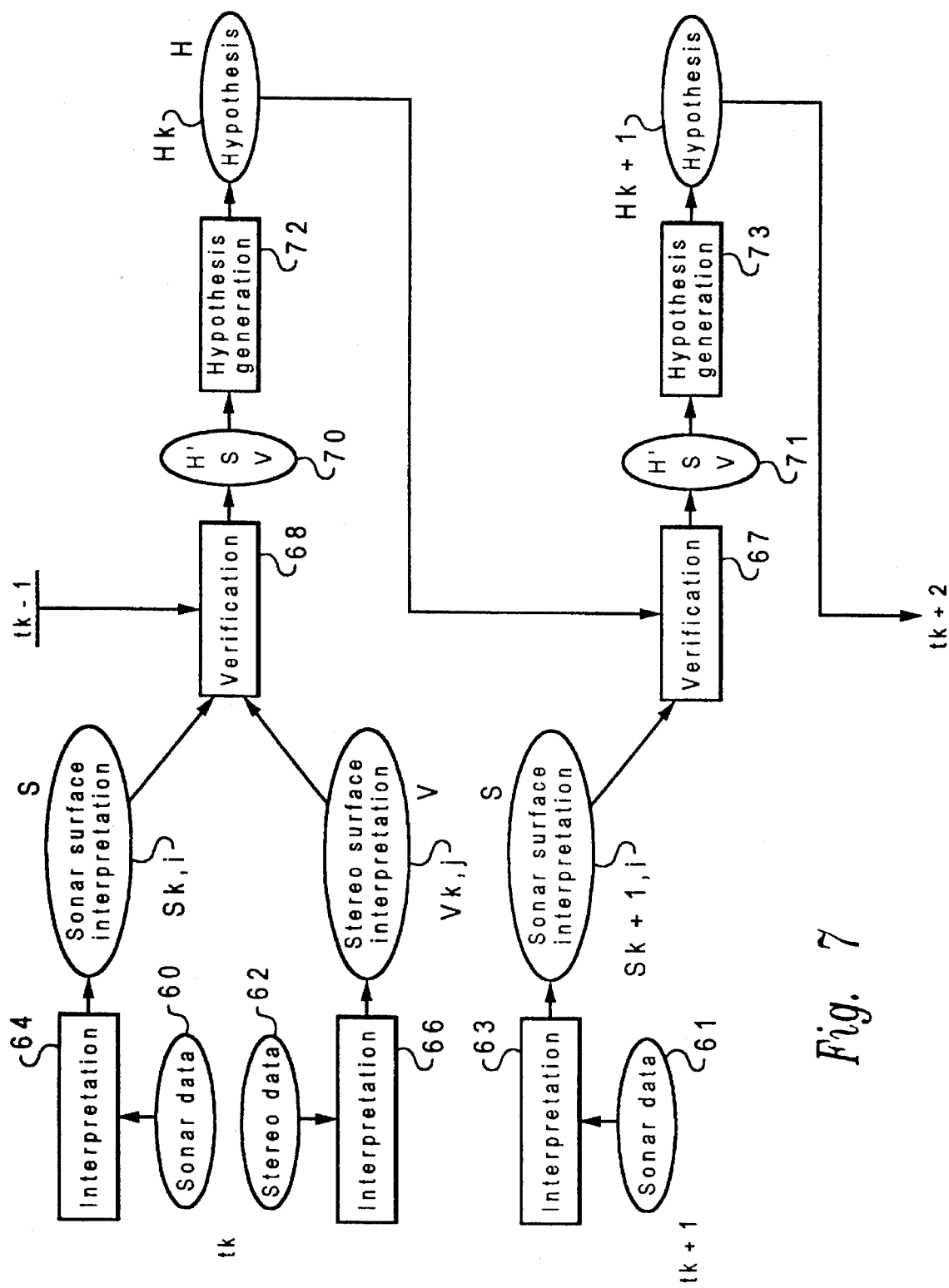
FIG. 7 is a flow chart depicting the verification of a hypothesis.

With reference now the FIG. 7, there is depicted a flowchart of the process utilized to generate and verify hypotheses. Data from the sonar ring devices 14 and stereo cameras 12 are interpreted at different sampling times since sonar data is obtained in a shorter cycle time than stereo camera data. Because hypothesis generation and verification are done each time sensor data is obtained, hypothesis generation and verification are done based either only on sonar data or on both sonar and stereo camera data. Each sensor data item is obtained continuously as mobile robot 10 moves.

As shown in FIG. 7, both sonar and stereo camera data are obtained at time $t_K$, after hypothesis generation and verification are complete for time $t_{K-1}$. Sonar data are obtained at block 60 within the range of distance measurement (detection region $S_r$ in FIG. 6). Stereo camera data are obtained at block 62 within the visual range (detection region $V_i$ in FIG. 6). Sonar data are interpreted at block 64 by sonar interpretation section 28, yielding interpretation data $S_{k,i}$ (i=1, 2, . . . , 8= total number of sonar devices), which specify a surface component. Stereo camera data 62 are interpreted at block 66 within stereo interpretation section 80 to yield interpretation data $V_{k,j}$ (j=1, 2, . . . number at which the total number of edges is obtained), which specify a surface component. Sonar and stereo camera data items provide a plurality of surface components. Attributes are then attached to all interpretation data $S_{k,i}$ and $V_{k,j}$ which indicate whether data is adopted in the hypothesis or already discarded at that point. In other words, interpretation data $S_{k,i}$ and $V_{k,i}$ are integrated to verify hypothesis $H_{k-1}$ immediately before integration.

The process then proceeds to block 68 where verification is performed. At block 68, the process determines whether hypothesis $H_{k-1}$ agrees with the surface component derived from sonar and stereo camera data. Portions of hypothesis $H_{k-1}$ which do not agree with the surface component are discarded, yielding data at block 70 which integrates the remainder of (agreed) hypothesis $H_{k-1}$ and current interpretation data $S_{k,i}$ and $V_{k,i}$. Using the integrated data represented by block 70, new hypothesis $H_K$ is generated at block 72. In hypothesis $H_k$, interpretation data $S_{k,i}$ and $V_{k,i}$ are associated to clarify which interpretation is reflected. At time $t_0$, when mobile robot 10 is first moved, any prior hypothesis is discarded so that only integration of interpretation data $S_{o,i}$ and interpretation data $V_{o,j}$ obtained from detected sensor data generates hypothesis $H_0$.

At time $t_{k+1}$, because sonar data are obtained in a shorter cycle time than stereo camera data, hypothesis generation and verification are performed utilizing only sonar data.

Sonar data is first obtained at block 61. Initially, the sonar data is interpreted at block 63 to yield interpretation data $S_{k+1, i}$, representing a surface component. The process then proceeds to block 67, which illustrated utilizing interpretation data $S_{k+1, i}$ to verify hypothesis $H_k$ at time $t_k$ immediately before integration. In other words, a determination is made whether or not hypothesis $H_k$ agrees with the surface component formed by sonar and stereo camera data assumed from the hypothesis immediately before integration. If part of the surface component of hypothesis $H_{k-1}$ conflicts is discarded, and data are obtained at block 71 to integrate the remainder of (agreed) hypothesis $H_K$ and current interpretation data $S_{k+1,i}, V_{k,j}$. Hypothesis generation is then performed at block 73 using integrated data of block 70 to generate a new hypothesis. In hypothesis $H_{k+1}$, interpretation data $S_{k+1,i}$ are associated to clarify which interpretation is reflected. Hypothesis verification and generation are then performed as previously described.

Figure 8A:
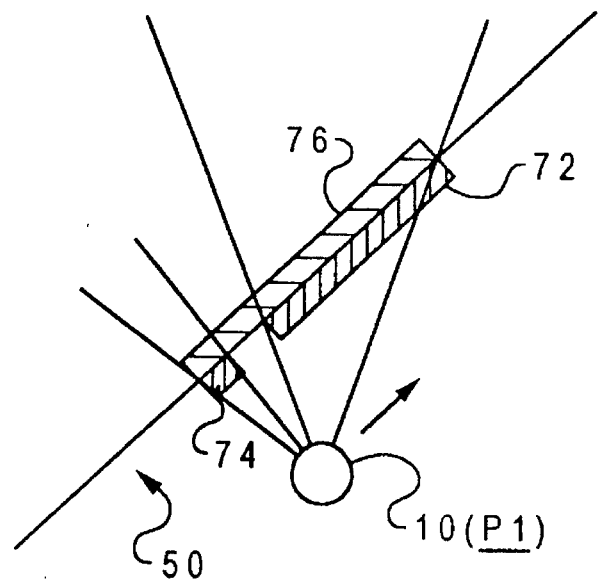
FIGS. 8A and 8B illustrate verifying a hypothesis of a plane.
Figure 8B:
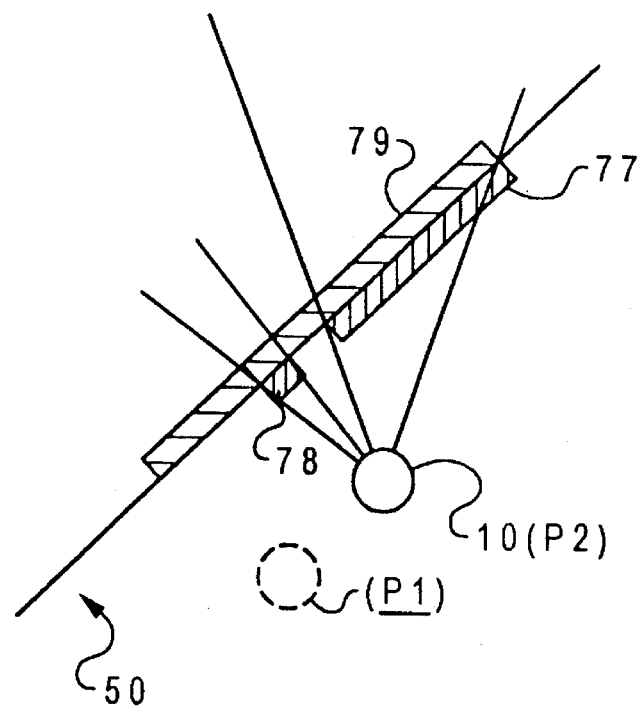

With reference now to FIGS. 8A and 8B, an example of hypothesis verification is described. FIG. 8A depicts mobile robot 10 at position P1 near wall 50. At this position, stereo camera data is interpreted to obtain extensible three-dimensional line segment 72 and sonar data is interpreted to obtain surface component 74. Form these interpretations, hypothesis 76, a long line segment extending from line segment 72 to surface component 74, is generated to represent wall 50.

Referring to FIG. 8B, the flat surface represented by hypothesis 76 is verified after mobile robot 10 moves to position P2. At position P2, stereo camera data yields three-dimensional line segment 77 and sonar data yields surface component 78. Since line segment 77 and surface component 78 correspond to previous hypothesis 76, previous data is interpreted as correct. A new hypothesis reflecting the previous hypothesis using a flat surface extended from hypothesis 76 is then generated. As shown in Table 1, even when no surface is interpreted from stereo camera data with respect to the hypothesis at this time, wall 50 interpreted as a glass surface, thus adopting the interpretation of sonar ring device 14.

As illustrated in Table 1 above, obtaining projecting and recessed surfaces with a hypothesis is limited to where the hypothesis is generated from the interpretation of stereo camera data. Therefore, if the environment around mobile robot 10 is a projecting or recessed surface, this surface should be interpreted from stereo camera data in the hypothesis generation phase.

Figure 9A:
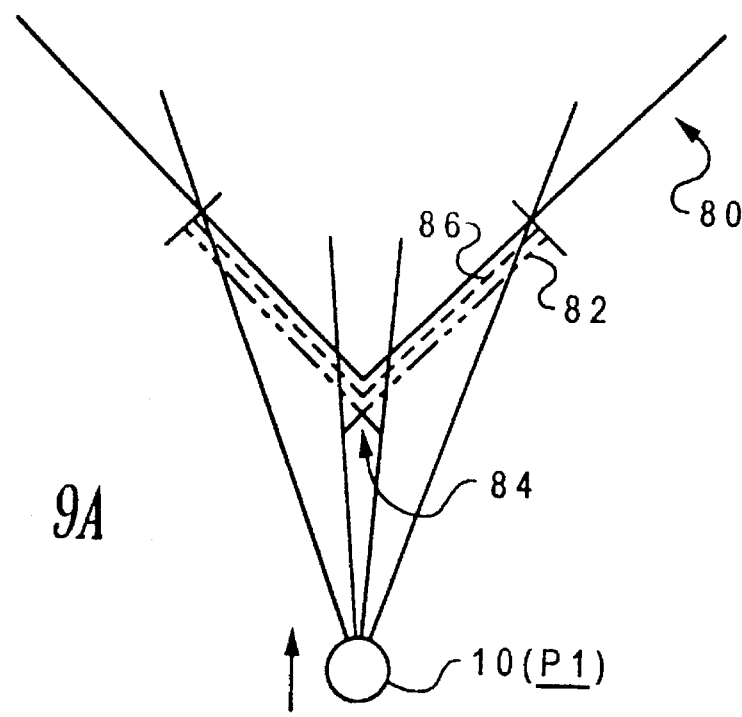
FIGS. 9A and 9B depict verifying a hypothesis of a projecting surface.
Figure 9B:
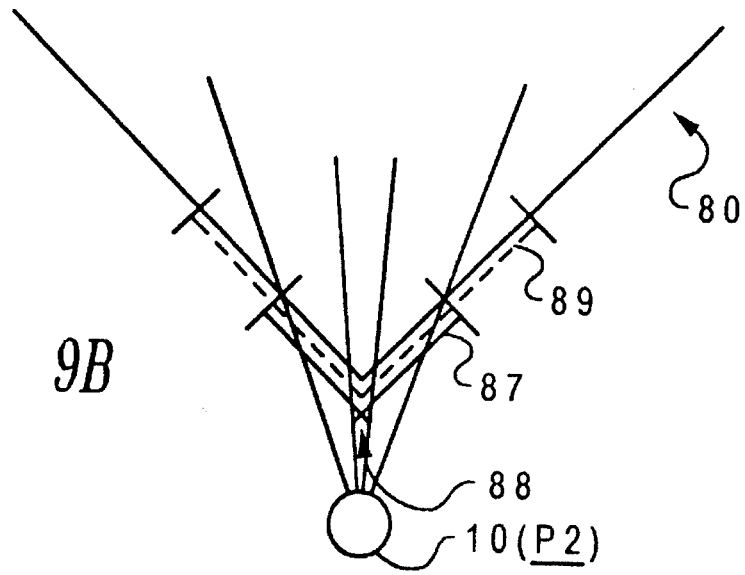

In verifying a hypothesis for a projecting surface, it is assumed that the hypothesis is verified when the interpretation of sonar concentrates only on the projection. That is, as depicted in FIG. 9A, when mobile robot 10 is positioned at position P1, surface component 84 is interpreted from sonar data as the leading portion of projecting surface 80, and three-dimensional line segment 82 is obtained from stereo camera data. From these interpretations, hypothesis 86, a projecting surface, is obtained. Hypothesis 86 is verified, as shown in FIG. 9B, when mobile robot 10 moves to position P2 after a predetermined period of time. Hypothesis 76 is verified since surface component 88, corresponding to the leading portion of projecting surface 80, and three-dimensional line segment 87 can also be obtained at position P2 from sonar and stereo camera data, respectively.

Figure 10A:
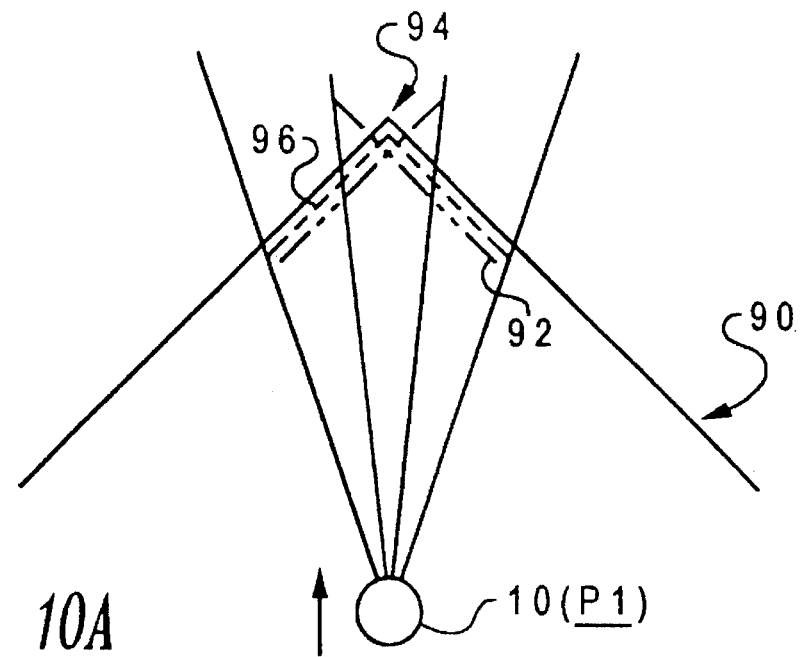
FIGS. 10A and 10B illustrate verifying a hypothesis a recessed surface.
Figure 10B:
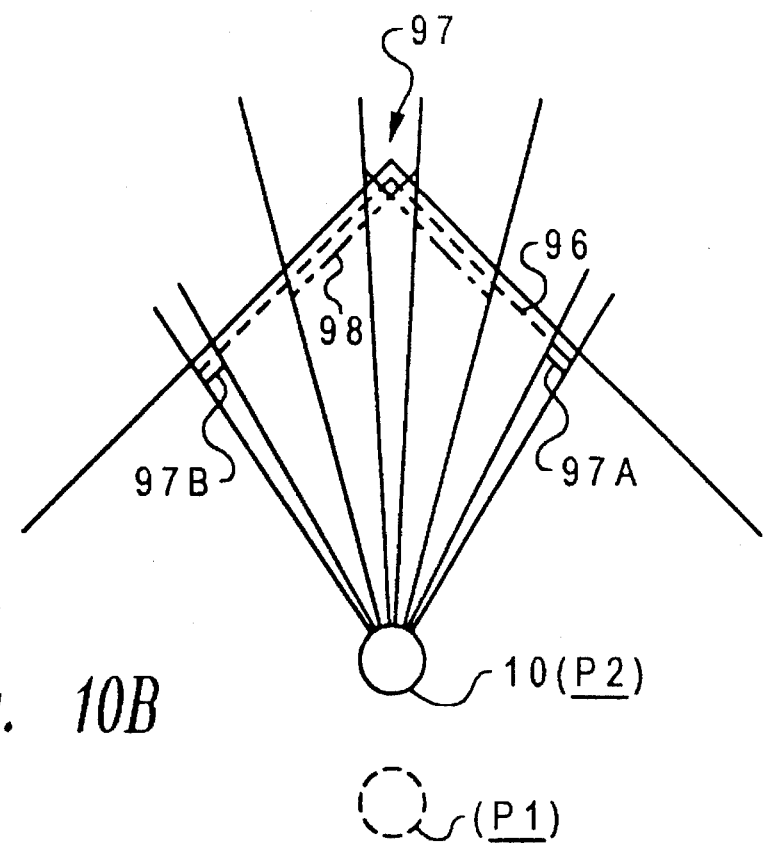

A hypothesis for a recessed surface is assumed to be verified when surface elements are interpreted around mobile robot 10 and at its sides. As shown in FIG. 10A, when mobile robot 10 is located at position P1, surface component 94 at the recessed corner of recessed surface 90 is obtained from sonar data, and three-dimensional line segment 92 is obtained from stereo camera data. Utilizing these interpretations hypothesis 96, a recessed surface, is generated. Hypothesis 96 is verified, as shown in FIG. 10B, when mobile robot 10 moves to position P2 after a predetermined period of time. When mobile robot 10 is located at position P2, surface component 97, corresponding to the recessed corner of recessed surface 90, can be determined from sonar data from one sonar device, and opposing surface components 97A and 97B can be determined from sonar data from another sonar device. Three-dimensional line segment 98 can also be obtained from stereo camera data. Therefore, similar to the verification of a flat surface, three-dimensional line segment 98, surface component 97, 97A, and 97B correspond to previous hypothesis 96, so that hypothesis 96, the recessed surface generated previously, is verified to be correct. If no sonar surface component is obtained when verifying hypotheses for projecting and recessed surfaces FIGS. 9B and 10B, stereo data is interpreted as a line segment drawn on a floor surface, and the previous hypothesis of a projecting or recessed surface is discarded.

Figure 11A:
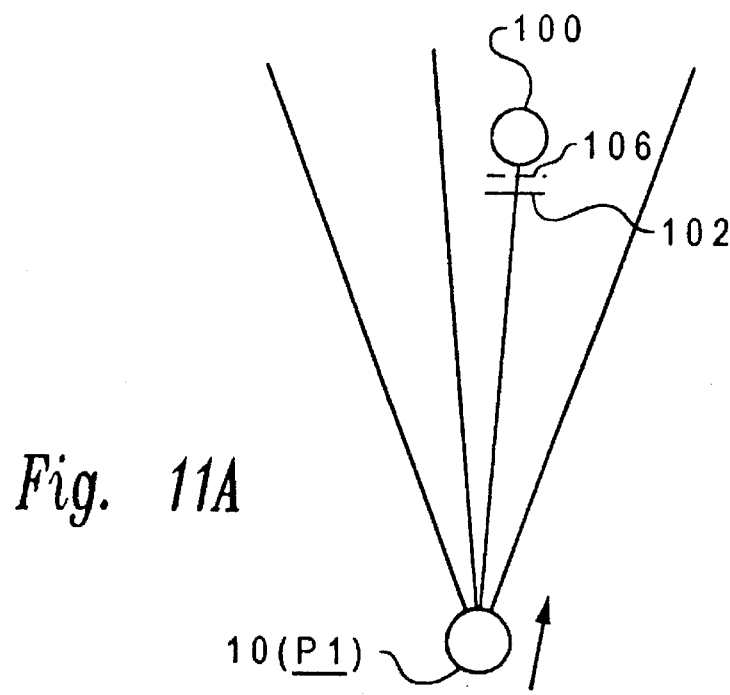
FIGS. 11A and 11B depict verifying a hypothesis of a small surface.
Figure 11B:
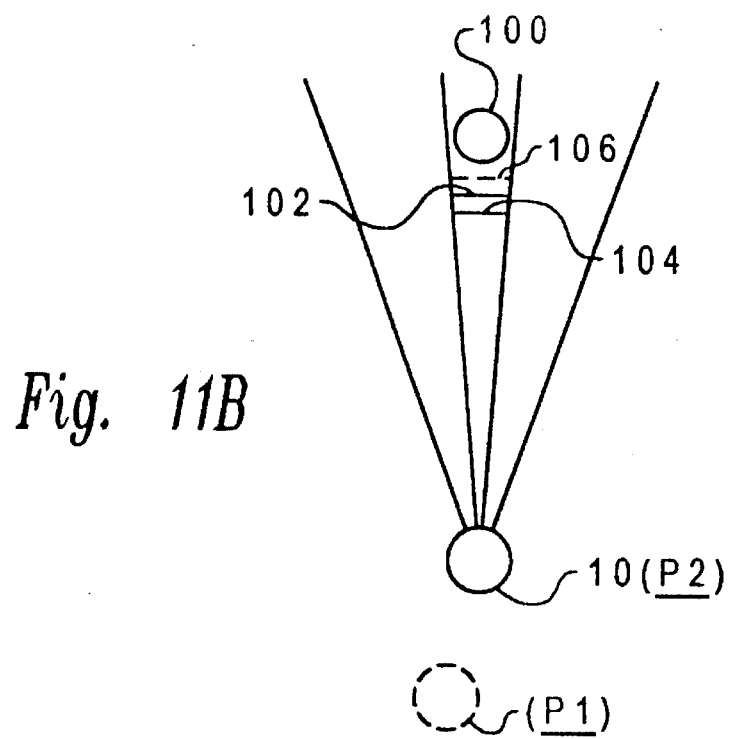

Verification of a hypothesis of an elongated object and a small surface object will now be explained with reference to FIGS. 11A and 11B. As shown in FIG. 11A, when mobile robot 10 is located at position P1, stereo camera data determines three-dimensional line segment 102, which is interpreted as an elongated or small surface. Since no sonar data is obtained from object 100, the interpretation is made that object 100 is remote. Thus, the object surface determined from stereo camera data is regarded as hypothesis 106. As shown in FIG. 11B, hypothesis 106 is verified when mobile robot 10 moves to position P2. Since at position P2 the distance to the surface is decreased, surface component 104 is obtained from sonar data to verify hypothesis 106. Thus, hypothesis 106, which interpreted sensor data as a small surface, is verified to be correct.

As described above, the hypothesis generated from sensor data obtained by stereo cameras 12 and sonar ring device 14 is verified utilizing stereo camera data after mobile robot 10 moves to a new location and sonar data is interpreted. It is then determined whether the hypothesis is adopted or not. If the hypothesis is discarded, a new hypothesis is generated. Even when the hypothesis is generated, new data is added and the hypothesis is expanded with the new data included.

Thus, a hypothesis is generated from the interpretation obtained from a plurality of different data with the result that, even if the first hypothesis is ambiguous, the environment can be detected from a position different from the original position after the movement of mobile robot 10. A hypothesis with high certainty can then be obtained by verifying data obtained with the passage of time. Using the hypothesis, an obstacle can be detected before mobile robot 10 attains a position close to the obstacle, thereby enabling safe, efficient robot movement. Thus, sensor data obtained by a plurality of different sensors is integrated to enable overall recognition of the real-time run environment of a mobile robot.

The described embodiment of the present invention emphasizes the recognition of whether or not an object surface is present on or near the run route of a mobile robot which would obstruct mobile robot movement. Strict environment recognition is needed to determine what the object is. Unlike active sensing, movement is not confined for an ambiguous interpretation. Interpretation is renewed based on data obtained in avoidance movement. Even when the interpretation remains ambiguous, the object is avoided, and data on the route point passed by the mobile robot is discarded. Thus, sensor detection data is done in real time during mobile robot movement. Although in the above-described preferred embodiment, distance and direction meters provide data, the present invention is not limited to the use of such devices. Sensor data obtained by sonar ring device 14 and stereo cameras 12 may also be used to determine distance and direction. In addition, the above-described hypothesis verification device is effectively employed in a mobile robot which determines the movement region in advance for free movement in the region while preparing an environment map. However, those skilled in the art will recognize that the present invention can be applied to a mobile robot which can run independently within a predetermined area by selecting the shortest distance between designated starting and ending points. Finally, in the above-described embodiment of the present invention, the operation of a mobile robot using different types of sensors, such as sonar and stereo cameras, was explained. The present invention is not limited, however, to utilizing these sensors. Infrared ray, laser, heat ray, or other types of sensors, which can provide three-dimensional information in combination with other sensors, may be used.

While the invention has been particularly shown and described with reference to a preferred embodiment, it will be understood by those skilled in the art that various changes in form and detail may be made therein without departing from the spirit and scope of the invention.

What is claimed is:

1. A control system for maneuvering a mobile robot comprising:

a memory;

a plurality of sensors, including at least a first sensor for detecting proximity of objects and a second sensor for detecting image information related to objects, wherein each of said plurality of sensors generates sensor data in response to a detection of an object;

means for interpreting sensor data generated by said plurality of sensors to determine a plurality of interpretations of said detected object, wherein each of said plurality of interpretations is determined from sensor data generated by a single one of said plurality of sensors and indicates whether a surface component of said detected object was sensed by that sensor;

a table stored within said memory, wherein said table associates interpretations of sensor data generated by said plurality of sensors with predetermined configurations of objects;

means for deriving a model of said detected object from said plurality of interpretations by referencing said table; and means, responsive to said derivation of said model of said detected object, for moving said mobile robot.

2. The control system for maneuvering a mobile robot of claim 1, wherein said means for deriving a model classifies configurations of objects by surface features characteristic of said objects, and wherein said table stores, for each of said surface features, combinations of interpretations of sensor data generated by each of said plurality of sensors.

3. The control system for maneuvering a mobile robot of claim 1, and further comprising:

means for verifying said model by comparing said model to interpretations of sensor data generated subsequent to said derivation of said model by at least one of said plurality of sensors; and means for discarding portions of said model to obtain an updated model, wherein said discarded portions of said model contradict said interpretations of sensor data generated subsequent to said derivation of said model by said at least one of said plurality of sensors.

4. The control system for maneuvering a mobile robot of claim 3, and further comprising:

means for thereafter deriving a second model of said particular object from said updated model and sensor data generated by at least one of said plurality of sensors.

5. A system for determining configurations of objects within an environment of a mobile robot, comprising:

a memory;

a plurality of sensors, including at least a first sensor for detecting proximity of objects and a second sensor for detecting image information related to objects, wherein each of said plurality of sensors generates sensor data in response to a detection of an object;

means for interpreting sensor data generated by said plurality of sensors to determine a plurality of interpretations of said detected object, wherein each of said plurality of interpretations is determined from sensor data generated by a single one of said plurality of sensors and indicates whether a surface component of said detected object was sensed by that sensor;

a table stored within said memory, wherein said table associates interpretations of sensor data generated by said plurality of sensors with predetermined configurations of objects; and means for deriving a model of said detected object from said plurality of interpretations by referencing said table.

6. The system for determining configurations of objects within an environment of a mobile robot of claim 5, wherein said means for deriving a model classifies configurations of objects by surface features characteristic of said objects, and wherein said table stores, for each of said surface features, combinations of interpretations of sensor data generated by each of said plurality of sensors.

7. The system for determining configurations of objects within an environment of a mobile robot of claim 5, and further comprising:

means for verifying said model by comparing said model to interpretations of sensor data generated subsequent to said derivation of said model by at least one of said plurality of sensors; and means for discarding portions of said model to obtain an updated model, wherein said discarded portions of said model contradict said interpretations of sensor data generated subsequent to said derivation of said model by said at least one of said plurality of sensors.

8. The system for determining configurations of objects within an environment of a mobile robot of claim 7, and further comprising:

means for thereafter deriving a second model of said particular object utilizing said updated model and sensor data generated by at least one of said plurality of sensors.

9. A method for maneuvering a mobile robot, said mobile robot having a plurality of sensors including a first sensor for detecting proximity of objects and a second sensor for detecting image information related to objects, said method comprising:

detecting an object proximate to said mobile robot utilizing said first sensor;

detecting image information related to said detected object utilizing said second sensor;

interpreting sensor data generated by said plurality of sensors to determine a plurality of interpretations of said detected object, wherein each of said plurality of interpretations is determined from sensor data generated by a single one of said plurality of sensors;

deriving a model of said detected object from said plurality of interpretations, wherein said model is derived by referencing a table in which combinations of interpretations of sensor data generated by said first and said second sensors are associated with predetermined configurations of objects; and in response to derivation of said model, moving said mobile robot.

10. The method for maneuvering a mobile robot of claim 6, and further comprising the steps of:

verifying said model by comparing said model to interpretations of sensor data generated by at least one of said plurality of sensors subsequent to said derivation of said model; and discarding portions of said model to obtain an updated first model, wherein discarded portions of said model contradict said interpretations of sensor data generated by at least one of said plurality of sensors subsequent to said derivation of said model.

11. The method for maneuvering a mobile robot of claim 9, and further comprising:

thereafter, deriving a second model of said particular object utilizing said updated model and sensor data generated by at least one of said plurality of sensors.

12. A method for determining an environment of a mobile robot, said mobile robot having a plurality of sensors, including a first sensor for detecting proximity of objects and a second sensor for detecting image information related to objects, said method comprising:

detecting an object proximate to said mobile robot utilizing said first sensor;

detecting image information related to said detected object utilizing said second sensor;

interpreting sensor data generated by said first and said second sensors to determine a plurality of interpretations of said detected object, wherein each of said plurality of interpretations is determined from data generated by a single one of said plurality of sensors; and deriving a model of said detected object from said plurality of interpretations, wherein said model is derived by referencing a table in which combinations of interpretations of sensor data generated by said first and said second sensors are associated with predetermined configurations of objects.

13. The method for determining an environment of a mobile robot of claim 12, and further comprising the steps of:

verifying said model by comparing said model to interpretations of sensor data generated subsequent to said derivation of said model by at least one of said plurality of sensors; and discarding portions of said model to obtain an updated model, wherein discarded portions of said model contradict said interpretations of sensor data generated subsequent to said derivation of said model by at least one of said plurality of sensors.

14. The method for determining an environment of a mobile robot of claim 13, and further comprising:

thereafter, deriving a second model of said detected object utilizing said updated model and sensor data generated by at least one of said plurality of sensors.

* * * * *

UNITED STATES PATENT AND TRADEMARK OFFICE
CERTIFICATE OF CORRECTION

PATENT NO. : 5,525,882
DATED : June 11, 1996
INVENTOR(S) : Asaka et al.

It is certified that error appears in the above-indentified patent and that said Letters Patent is hereby corrected as shown below:

Column 4, line 8: delete the first shown "36"

<u>In the Abstract [57]</u>:

Third line from the bottom: insert --.-- after "objects"

Third line from the bottom: change "in" to --In--

Signed and Sealed this

Fifteenth Day of October, 1996

Attest:

BRUCE LEHMAN

*Attesting Officer*  *Commissioner of Patents and Trademarks*